United States Patent
Kamae et al.

(10) Patent No.: US 7,148,294 B2
(45) Date of Patent: Dec. 12, 2006

(54) EPOXY RESIN COMPOSITION, PROCESS FOR PRODUCING FIBER-REINFORCED COMPOSITE MATERIALS AND FIBER-REINFORCED COMPOSITE MATERIALS

(75) Inventors: Toshiya Kamae, Iyo-gun (JP); Hiroki Oosedo, Iyo-gun (JP); Go Tanaka, Iyo-gun (JP); Shigeo Iwasawa, Matsuyama (JP)

(73) Assignee: Toray Industries, Inc., Tokyo (JP)

( * ) Notice: Subject to any disclaimer, the term of this patent is extended or adjusted under 35 U.S.C. 154(b) by 134 days.

(21) Appl. No.: 10/380,965

(22) PCT Filed: Mar. 27, 2002

(86) PCT No.: PCT/JP02/02985

§ 371 (c)(1),
(2), (4) Date: Mar. 21, 2003

(87) PCT Pub. No.: WO02/081540

PCT Pub. Date: Oct. 17, 2002

(65) Prior Publication Data

US 2004/0044147 A1    Mar. 4, 2004

(30) Foreign Application Priority Data

Mar. 30, 2001 (JP) ............................. 2001-100339

(51) Int. Cl.
    C08G 59/50    (2006.01)
    C08G 59/62    (2006.01)
    C08L 63/00    (2006.01)
    C08L 63/02    (2006.01)

(52) U.S. Cl. .................. 525/523; 525/485; 525/486; 528/110; 528/117; 528/121; 528/124

(58) Field of Classification Search ................ 525/523; 528/104
    See application file for complete search history.

(56) References Cited

U.S. PATENT DOCUMENTS

| | | | |
|---|---|---|---|
| 4,159,976 A | | 7/1979 | Moran, Jr. ................ 525/423 |
| 5,308,895 A | * | 5/1994 | Gan et al. .................. 523/445 |
| 2004/0044147 A1 | * | 3/2004 | Kamae et al. ............. 525/523 |

FOREIGN PATENT DOCUMENTS

| | | | |
|---|---|---|---|
| EP | 0025178 A1 | | 3/1981 |
| EP | 604089 A1 | * | 6/1994 |
| GB | 1541610 | * | 3/1979 |
| JP | 55075421 A | * | 6/1980 |
| JP | 2-103224 | | 4/1990 |
| JP | 02103224 A | * | 4/1990 |
| JP | 06145303 A | * | 5/1994 |
| JP | 6-287270 | | 10/1994 |
| JP | 11-302412 | | 11/1999 |
| JP | 2000063492 A | * | 2/2000 |
| JP | 2000-109578 | | 4/2000 |
| JP | 2001-64406 | | 3/2001 |
| SU | 1693014 A1 | * | 11/1991 |
| WO | WO-95/18168 | | 7/1995 |

OTHER PUBLICATIONS

Chemical abstracts registry No. 85-43-8 for tetrahydrophthalic anhydride, 1967.*

* cited by examiner

Primary Examiner—Robert Sellers
(74) Attorney, Agent, or Firm—Morrison & Foerster LLP

(57) ABSTRACT

An epoxy resin composition comprises (a) an epoxy resin, (b) an anionic polymerization initiator and (c) from 1 to 30 parts by weight per 100 parts by weight of epoxy resin (a) of an aromatic ring-containing proton donor of a polyhydric alcohol and/or a polymercaptan.

10 Claims, 2 Drawing Sheets

EPOXY RESIN COMPOSITION, PROCESS FOR PRODUCING FIBER-REINFORCED COMPOSITE MATERIALS AND FIBER-REINFORCED COMPOSITE MATERIALS

FIELD OF THE INVENTION

The present invention relates to an epoxy resin composition that is preferably used for fiber-reinforced composite materials, and further relates to a process for producing fiber-reinforced composite materials by impregnating a reinforcing fiber substrate placed in a mold with a liquid thermosetting resin composition, and heating to cure, and further relates to the fiber-reinforced composite materials made thereby.

BACKGROUND OF THE INVENTION

The use of fiber-reinforced composite materials consisting of reinforcing fibers and matrix resins has been widely extended to the fields including aerospace, sports, and general industry fields, because fiber-reinforced composite materials make it possible to design materials that have benefits of both reinforcing fibers and matrix resins.

As reinforcing fibers, glass fibers, aramid fibers, carbon fibers, boron fibers, and the like may be used. As matrix resins, both thermosetting resins and thermoplastic resins may be used, but thermosetting resins are more frequently used because reinforcing fibers can be more easily impregnated the thermosetting resins. As thermosetting resins, epoxy resins, unsaturated polyester resins, vinyl ester resins, phenolic resins, maleimide resins, cyanate resins, and the like may be used.

For producing fiber-reinforced composite materials, various methods such as prepreg method, hand lay-up method, filament winding method, pultrusion method, RTM (Resin Transfer Molding) method, and the like may be used.

Among them, the RTM method where a reinforcing fiber substrate placed in a mold is impregnated with a liquid thermosetting resin, and heated to cure has a great advantage that a fiber reinforced composite materials of complicated shape can be molded.

Recently, there has been a need for producing fiber-reinforced composite materials of high fiber volume fraction (Vf) (particularly more than about 45%), which are lightweight, and excellent in mechanical properties such as strength and elastic modulus, by using the RTM method. However, it has been difficult to efficiently produce fiber-reinforced composite materials with high Vf in a short time period using the conventional RTM method.

In the RTM method, the packing fraction of reinforcing fibers in a mold should be high to produce fiber-reinforced composite materials with high Vf, because the Vf of a product is mainly determined by the packing fraction of reinforcing fibers in a mold. If the packing fraction is high, permeability is low, because high packing fraction means low void fraction. And if the permeability is low, injection time of the resin composition is lengthened.

If the thermosetting resin composition is heated to cure at a constant temperature, viscosity of the liquid composition increases, and then, gelation occurs. After gelation, rubbery polymer is obtained. The glass transition temperature of the polymer increases as the curing reaction progresses. If the glass transition temperature exceeds the curing temperature, the polymer turns to a glassy polymer. In general, demolding is carried out after vitrification. For general thermosetting resin compositions, the ratio of the time required from the beginning of injection to vitrification to the time from the beginning of the injection to a point during which the thermosetting resin compositions maintain liquid phase with a viscosity adequate for injection is usually greater than 6.

In cases of producing fiber-reinforced composite materials whose Vf is not high, it is possible to carry out the method in a short time (several minutes or about ten minutes), where injection is terminated before the viscosity of the thermosetting resin compositions becomes too high, and curing for a predetermined time and demolding are carried out while maintaining the mold temperature constant, because injection time of the resin composition can be short. This method is often called S-RIM (Structural Reactive Injection Molding).

However, in cases fiber-reinforced composite materials with high Vf, it is impossible to carry out the same method mentioned above at the mold temperature at which the curing reaction is terminated in a short time, because rapid increase of viscosity, and furthermore, gelation occurs during impregnation. On the other hand, if the temperature or the reactivity of the thermosetting resin composition is lowered to prevent rapid increase of viscosity during impregnation, the time before the demolding is increased, and the overall molding process time is increased. To decrease molding process time, raising the temperature of the mold is often used after the termination of injection. This method, however, is not sufficient to decrease total molding process time because the method requires additional time to raise and lower the temperature of the mold.

The object of the present invention is to provide the epoxy resin compositions that have a low ratio of time required from the beginning of the injection to vitrification to time required from the beginning of the injection to a point during which the thermosetting resin compositions maintain liquid phase having viscosity adequate for injection.

Epoxy resin compositions that are similar to those of the present invention are disclosed in Japanese patent laid-open publication No. 1978-113000. These epoxy resin compositions comprise epoxy resins, imidazole derivatives, methanol and/or ethanol. In these epoxy resin compositions, methanol and/or ethanol function as solvent, and occupy a large proportion of the compositions. The above patent document also states that methanol and (or) ethanol is volatilized before curing. If such epoxy resin compositions are injected into a mold and heated to cure, it is impossible to volatilize the methanol and/or ethanol. If curing is carried out in the presence of large amounts of methanol and (or) ethanol, cured resin products with crosslinking structure cannot be obtained or cured resin products having very low crosslinking density is obtained. Therefore, these epoxy resin compositions have not been used as a matrix resin for the RTM method.

Japanese patent laid-open publication No. 1990-103224 discloses epoxy resin compositions comprising epoxy resins, an imidazole derivative, boric acid and mannitol. In the compositions disclosed by the above patent, solid bodies prepared by grinding the mixture of imidazole derivatives, boric acid and mannitol is used to blend with the epoxy resins. However, if the reinforcing fiber substrate is impregnated with such epoxy resin compositions, heterogeneity of the composition is raised because the solid bodies hardly penetrate into bundles of reinforcing fibers. Thus, curing of the resin compositions is insufficient in some regions, and cured resin products having high glass transition temperature cannot be obtained. Therefore, these epoxy resin compositions have not used as a matrix resin for the RTM method.

Journal of Applied Polymer Science, Vol. 30, pp. 531–536 discloses a mixture comprising p-cresol glycidyl ether, an imidazole derivative, and isopropyl alcohol. However, if this mixture is reacted, the resulting product is a soft linear polymer without a crosslinking structure. Therefore, this mixture cannot satisfy requirements of high glass transition temperature and strength necessary for a matrix resin in a fiber-reinforced composite material.

None of the above compositions or mixtures can increase glass transition temperature even when heated to induce reaction, and are not suitable for advantages such as provided by the present invention which are to decrease the ratio of time from the beginning of the injection to vitrification, to the time from the beginning of the injection to a point during which the thermosetting resin compositions maintain liquid phase having viscosity adequate for injection.

DETAILED DESCRIPTION OF THE INVENTION

The epoxy resin composition of the present invention solves the stated problems in the art. The epoxy resin composition of the present invention consists of components (a), (b) and (c) defined below, wherein the amount of component (c) based on 100 parts by weight of the component (a) is 1 to 30 parts by weight, component (a) is liquid, and components (b) and (c) are homogeneously dissolved in component (a).

(a) epoxy resin
(b) anionic polymerization initiator
(c) proton donor

A process for producing the fiber-reinforced composite materials of the present invention that provides a solution to the afore-stated problems, is described below.

The process for producing fiber-reinforced composite materials where a thermosetting resin composition is injected into reinforcing fiber substrates placed in a mold maintained at the specific temperature $T_m$ between 60 to 180° C., and heated to cure at the specific temperature $T_m$ in a manner that the following conditions (7) to (9) are satisfied:

$$t_i \leq 10 \qquad (7)$$

$$t_m \leq 60 \qquad (8)$$

$$1 < t_m/t_i \leq 6.0 \qquad (9)$$

wherein, $t_i$: time from the beginning of the injection to the termination of injection (min.)

$t_m$: time from the beginning of the injection to the beginning of the demolding (min.)

Figure 1:
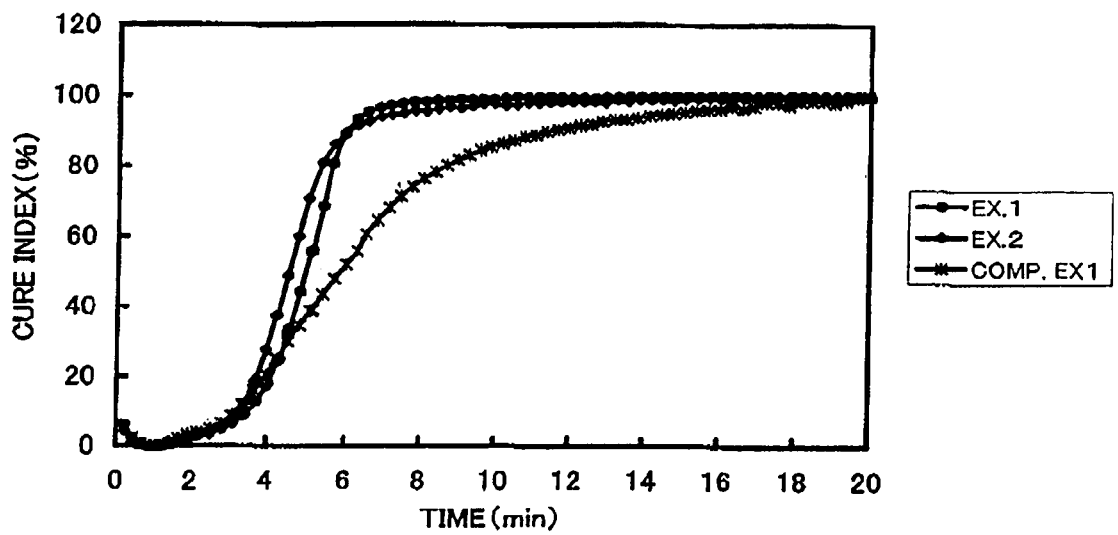
FIG. 1. represents change of cure index versus time obtained by dielectric measurement of the epoxy resin composition of the present invention.

Reference number 1 represents a cavity of a mold, reference number 2 represents an upper mold, reference number 3 represents lower mold, reference number 4 represents an inlet, reference number 5 represents an outlet, reference numbers 6 and 7 represent runners, reference numbers 8 and 9 represent film-gates, reference numbers 10 and 15 represent reinforcing fiber substrates, reference number 11 represents a peel ply, reference number 12 represents a resin distribution medium, reference number 13 represents a core, and reference number 14 represents a resin feeder groove.

BEST MODE FOR CARRYING OUT THE INVENTION

First, the epoxy resin composition of the present invention is described.

The epoxy resin composition of the present invention consists of components (a), (b) and (c) defined below, wherein the amount of the component (c) based on 100 parts by weight of the component of (a) is 1 to 30 parts by weight, the component (a) is liquid, and components (b) and (c) are homogeneously dissolved in component (a).

(a) epoxy resin
(b) anionic polymerization initiator
(c) proton donor

The component (a) of the present invention is an epoxy resin. An epoxy resin is defined herein as a compound which has a plurality of epoxy groups in one molecule.

It is preferable that component (a) has one member selected from the group consisting of an aromatic ring, a cycloalkane ring, and a cycloalkene ring, because the resulting cured resin products have good heat resistance and good mechanical properties such as elastic modulus. As the cycloalkane ring, a cyclopentane ring, a cyclohexane ring, and the like, are preferable, and a bicycloalkane ring and a tricycloalkane ring, such as norbornane ring and a tricyclo [$5.2.1.0^{2.6}$] decane ring that have a cyclopentane ring or a cyclohexane ring in their structures, are also preferable. As the cycloalkene ring, a cyclopentene ring and a cyclohexene ring are preferable, and a bicycloalkene ring and a tricycloalkene ring that have a cyclopentene ring or a cyclohexene ring in their structures are also preferable.

The viscosity of component (a) of the present invention at 25° C. is preferably 1 to 30,000 mP s, more preferably 1 to 20,000 mP s, and further preferably 1 to 10,000 mP s. If the viscosity is higher than these ranges, the initial viscosity of the epoxy resin composition at the injection temperature of 60 to 180° C. may become high, so that it takes long to impregnate the reinforcing fibers with the resin composition. When the component (a) comprises plural epoxy resins, the viscosity of the mixture is used.

Examples of component (a) are aromatic glycidyl ether obtainable from phenol having plural hydroxyl groups, aliphatic glycidyl ether obtainable from alcohol having plural hydroxyl groups, glycidyl amine obtainable from amine, glycidyl ester obtainable from carboxylic acid having plural carboxyl groups, polyepoxide obtainable by oxidizing compounds having plural double bonds in the molecule, and the like.

Examples of aromatic glycidyl ether are diglycidyl ether obtainable from bisphenol, such that, diglycidyl ether of bisphenol A, diglycidyl ether of bisphenol F, diglycidyl ether of bisphenol AD, diglycidyl ether of bisphenol S, and diglycidyl ether of tetrabromo bisphenol A, and the like; polyglycidyl ether of novolac obtainable from phenol, alkyl phenol, halogenated phenol, and the like; diglycidyl ether of resorcinol, diglycidyl ether of hydroquinone, diglycidyl ether of 4,4'-dihydroxy-3,3',5,5'-tetramethylbiphenyl, diglycidyl ether of 1,6-dihydroxynaphthalene, diglycidyl ether of 9,9'-bis(4-hydroxyphenyl)fluorene, triglycidyl ether of tris (p-hydroxyphenyl)methane, tetraglycidyl ether of tetrakis(p-hydroxyphenyl)ethane, diglycidyl ether having oxazolidone backbone obtainable by reacting diglycidyl ether of bisphenol A with di-functional isocyanate, and the like.

Examples of aliphatic glycidyl ether are diglycidyl ether of ethylene glycol, diglycidyl ether of propylene glycol, diglycidyl ether of 1,4-butanediol, diglycidyl ether of 1,6-hexanediol, diglycidyl ether of neopentyl glycol, diglycidyl ether of cyclohexane dimethanol, diglycidyl ether of glycerin, triglycidyl ether of glycerin, diglycidyl ether of trimethylolethane, triglycidyl ether of trimethylolethane, diglycidyl ether of trimethylolpropane, triglycidyl ether of trimethylolpropane, tetraglycidyl ether of pentaerythritol, diglycidyl ether of dodecahydro bisphenol A, diglycidyl ether of dodecahydro bisphenol F, and the like.

Examples of glycidyl amine are diglycidylaniline, tetraglycidyldiaminodiphenylmethane, N,N,N',N'-tetraglycidyl-m-xylylenediamine, and 1,3-bis (diglycidylaminomethyl) cyclohexane; triglycidyl-m-aminophenol and triglycidyl-p-aminophenol having both structures of glycidyl ether and glycidyl amine, and the like.

Examples of glycidyl ester are diglycidyl ester of phthalic acid, diglycidyl ester of terephthalic acid, diglycidyl ester of hexahydrophthalic acid, diglycidyl ester of dimer acid, and the like.

In addition to the above, triglycidylisocyanurate may be used and epoxy resins having an epoxycyclohexane ring and epoxylated soybean oil, which are obtainable by oxidizing a compound having plural double bonds in the molecule, and the like, may also be used.

Among them, diglycidyl ether of bisphenol A, diglycidyl ether of bisphenol F, and diglycidyl ether of bisphenol AD are preferably used because the viscosity of the resin composition thereof, heat resistance, and mechanical properties such as elastic modulus of resulting cured resin products are good.

Component (b) of the present invention is an anionic polymerization initiator used as a curing agent of epoxy resins. An anionic polymerization initiator is defined herein as a compound capable of initiating anionic polymerization of the epoxy resin.

The amount of the component (b) is preferably 0.1 to 10 parts by weight, more preferably 0.1 to 5 parts by weight based on 100 parts by weight of the component (a). If the amount is greater than these ranges, the excess component (b) functions as a plasticizer so that the heat resistance and the mechanical properties such as elastic modulus of the resulting cured resin product tend to be poor.

Examples of the component (b) are hydroxides, such as sodium hydroxide, potassium hydroxide, and quaternary ammonium hydroxide; alkoxides, such as sodium alkoxide; iodides, such as sodium iodide, potassium iodide, quaternary ammonium iodide; tertiary amine, and the like.

Among them, tertiary amine is preferably used as component (b) because of its high ability as an anionic polymerization initiator.

Examples of the tertiary amine are triethylamine, dimethylbenzylamine, 2,4,6-tris(dimethylaminomethyl)phenol, 1,5-diazabicyclo[4.3.0]nona-5-en, 1,8-[5.4.0]undeca-7-en, pyridine, 4-dimethylaminopyridine, 3-dimethylaminopropylamine, 3-diethylaminopropylamine, 3-dibutylaminopropylamine, 2-diethylaminoethylamine, 1-diethylamino-4-aminopentane, N-(3-aminopropyl)-N-methylpropanediamine, 1-(2-aminoetheyl)piperazine, 1,4-bis(2-aminoethyl)piperazine, 3-(3-dimethylaminopropyl) propylamine, 1,4-bis(3-aminopropyl)piperazine, 4-(2-aminoethyl)morpholine, 4-(3-aminopropryl)morpholine, imidazole derivatives, and the like.

Among them, an imidazole derivative is preferably used as component (b) because it has high ability as an anionic polymerization initiator, and it can cure the epoxy resin composition in a short time.

Examples of imidazole derivative are imidazole, 2-methylimidazole, 2-ethylimidazole, 2-undecylimidazole, 2-heptadecylimidazole, 2-phenylimidazole, 1,2-dimethylimidazole, 2-ethyl-4-methylimidazole, 2-phenyl-4-methylimidazole, 1-benzyl-2-phenylimidazole, 1-benzyl-2-methylimidazole, 1-cyanoethyl-2-methylimidazole, 1-aminoethyl-2-methylimidazole, and the like.

Among them, imidazoles represented by the following formula I are preferably used as component (b) because they have extremely high ability as an anionic polymerization initiator and they can cure the epoxy resin composition in a short time.

[Formula I]

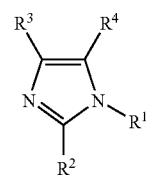

wherein, $R^1$ represents a member selected from the group consisting of hydrogen atom, a methyl group, an ethyl group, a benzyl group, or a cyanoethyl group; $R^2$, $R^3$, and $R^4$ each represent any member selected from the group consisting of a hydrogen atom, a methyl group and an ethyl group.

The component (c) of the present invention is a proton donor. A proton donor is defined herein as a compound having active hydrogen which can be donated as a proton to basic compounds.

Also, said active hydrogen of the present invention is defined herein as hydrogen that can be donated to basic compounds as a proton.

The proton donor functions as a chain transfer agent if the resulting anionic species after a proton donation have moderate nucleophilicity. If suitable chain transfer reaction occurs at the beginning of a polymerization, it inhibits the epoxy resin from becoming a too high molecular weight polymer or inhibits gelation which prevents increase of viscosity. As a result, it is possible to secure long injection time. In addition, the presence of a proton donor enhances anionic polymerization. By using these two advantageous properties, it is possible to design a thermosetting resin composition that prevents increase of viscosity at the beginning of a reaction and accelerates completion of a curing reaction.

Based on the above, preferred examples for component (c) are proton donors selected from the group consisting of an alcohol, a phenol, a mercaptan, a carboxylic acid and a 1,3-dicarbonyl compound. The component (c) may be a compound that belongs to multiple categories of these exemplary compounds, such as a compound having an alcoholic hydroxyl group and a phenolic hydroxyl group.

The component of (a) may include compounds that have a hydroxyl group in the molecule, in such a case, they are not included in the component of (c).

The amount of the component (c) is 1 to 30 parts by weight and preferably 1 to 20 parts by weight based on 100 parts by weight of the component (a). If the amount is less than these ranges, it may be difficult to decrease curing time while preventing increase of viscosity. If the amount is greater than these ranges, heat resistance and mechanical properties such as elastic modulus tend to be poor.

The component (c) is introduced to the crosslinking structure by reacting with the epoxy resins, and influences heat resistance and mechanical properties of the cured resin product. Thus, it is preferable that the component (c) is a compound having two or more active hydrogen in one molecule. When compounds having one active hydrogen in one molecule are used, crosslinking density of the resulting cured resin product tends to be lowered so that heat resistance and mechanical properties such as elastic modulus, may be poor.

The compounds that have an aromatic ring, cycloalkane ring or a cycloalkene ring are preferably used as component (c) because the heat resistance and mechanical properties of the resulting cured resin products such elastic modulus, are good.

An alcohol is preferably used as the component (c) because the resulting anion species after a proton donation has the most preferable nucleophilicity.

An alcohol having a boiling point at atmospheric pressure of more than 100° C., preferably more than 140° C., and further preferably more than 180° C. at atmospheric pressure, is preferable. If the boiling point is low, voids may occur in the fiber-reinforced composite materials due to evaporation of the component (c) during injection or curing. When two or more components (c) are used, all such components should satisfy the above conditions.

An alcohol of which the hydroxyl equivalent weight is more than 100 g/mol, preferably more than 120 g/mol, and further preferably 140 g/mol, is preferable. If the equivalent weight is less than these ranges, the polarity of the alcohol tends to be too high. Thus, its compatibility with epoxy resins tends to be insufficient, and difficulty in handling may occur. When two or more alcohols are used, a harmonic average of hydroxyl equivalent weights that is weighted by weight fractions of the alcohols, is used as the hydroxyl equivalent weight of the mixture.

Examples of preferred alcohols are: 1,2-ethanediol (Bp=197, He=31), 1,2-propanediol (Bp=187, He=38), 1,3-propanediol (Bp=215, He=38), 1,3-butanediol (Bp=208, He=45), 1,4-butanediol (Bp=228, He=45), 1,5-pentanediol (Bp=239, He=52), 1,1-dimethyl-1,3-propanediol (Bp=203, He=52), 2,2-dimethyl-1,3-propanediol (Bp=211, He=52), 2-methyl-2,4-pentanediol (Bp=198, He=59), 1,4-cyclohexanediol (Bp=150 [2.66 kPa], He=58), 1,4-cyclohexanedimethanol (Bp=162 [1.33 kPa]), diethyleneglycol (Bp=244, He=53), triethyleneglycol (Bp=287, He=75), dodecahydro bisphenol A (Bp: no data, He=120), ethylene oxide adduct of bisphenol A represented by the following formula II (Bp: no data, He=158), propylene oxide adduct of bisphenol A represented by the following formula IV (Bp: no data, He=172), ethylene oxide adduct of dodecahydro bisphenol A represented by the following formula IV (Bp: no data, He=164), propylene oxide adduct of dodecahydro bisphenol A represented by the following formula V (Bp: no data, He=178), glycerin (Bp=290, He=31), trimethylolethane (Bp=165 to 171 [0.864 kPa], He=40), trimethylolpropane (Bp=292, He=45), and the like, wherein, Bp means boiling point (° C.), and He means hydroxyl equivalent (g/mol). Examples of alcohols that comprise four hydroxyl groups in one molecule are pentaerythritol (Bp: no data, He=34), and the like.

[Formula II]

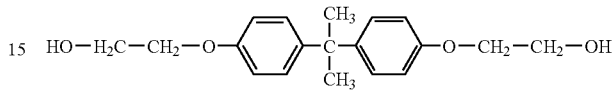

[Formula III]

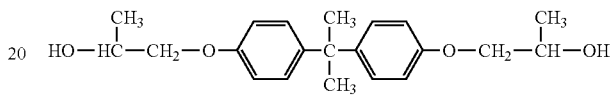

[Formula IV]

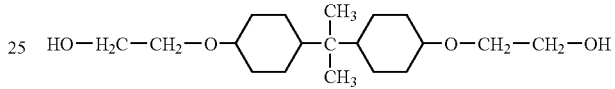

[Formula V]

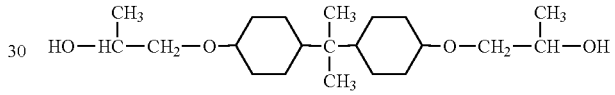

Examples of phenols having one active hydrogen in one molecule are phenol, cresol, ethylphenol, n-propylphenol, isopropylphenol, n-butylphenol, sec-butylphenol, tert-butylphenol, cyclohexylphenol, dimethylphenol, methyl-tert-butylphenol, di-tert-butylphenol, chlorophenol, bromophenol, nitrophenol, methoxyphenol, methyl salicylate, and the like. Examples of phenols having two active hydrogen in one molecule are hydroquinone, resorcinol, catechol, methylhydroquinone, tert-butylhydroquinone, benzylhydroquinone, phenylhydroquinone, dimethylhydroquinone, methyl-tert-butylhydroquinone, di-tert-butylhydroquinone, trimethylhydroquinone, methoxyhydroquinone, methylresorcinol, tert-butylresorcinol, benzylresorcinol, phenylresorcinol, dimethylresorcinol, methyl-tert-butylresorcinol, di-tert-butylresorcinol, trimethylresorcinol, methoxyresorcinol, methylcatechol, tert-butylcatechol, benzylcatechol, phenylcatechol, dimethylcatechol, methyl-tert-butylcatechol, di-tert-butylcatechol, trimethylcatechol, methoxycatechol, biphenols such as biphenol, 4,4'-dihydroxy-3,3',5,5'-tetramethylbiphenyl, 4,4'-dihydroxy-3,3',5,5'-tetra-tert-butylbiphenyl, and the like, bisphenols such as bisphenol A, 4,4'-dihydroxy-3,3',5,5'-tetramethyl bisphenol A, 4,4'-dihydroxy-3,3',5,5'-tetra-tert-butyl bisphenol A, bisphenol F, 4,4'-dihydroxy-3,3',5,5'-tetramethyl bisphenol F, 4,4'-dihydroxy-3,3',5,5'-tetra-tert-butyl bisphenol F, bisphenol AD, 4,4'-dihydroxy-3,3',5,5'-tetramethyl bisphenol AD, 4,4'-dihydroxy-3,3',5,5'-tetra-tert-butyl bisphenol AD, and compounds represented by the following formulas VI to XII, terpenephenol, compounds represented by the following formulas XIII to XIV, and the like. Examples of phenols having three active hydrogen in one molecule are trihydroxybenzene, tris(p-hydroxyphenyl)methane, and the like. Examples of phenols having four active hydrogen in one molecule are tetrakis(p-hydroxyphenyl)ethane, and the like. In addition to the above, other examples may include novolac of phenols such as phenol, alkylphenol, and halogenated phenol.

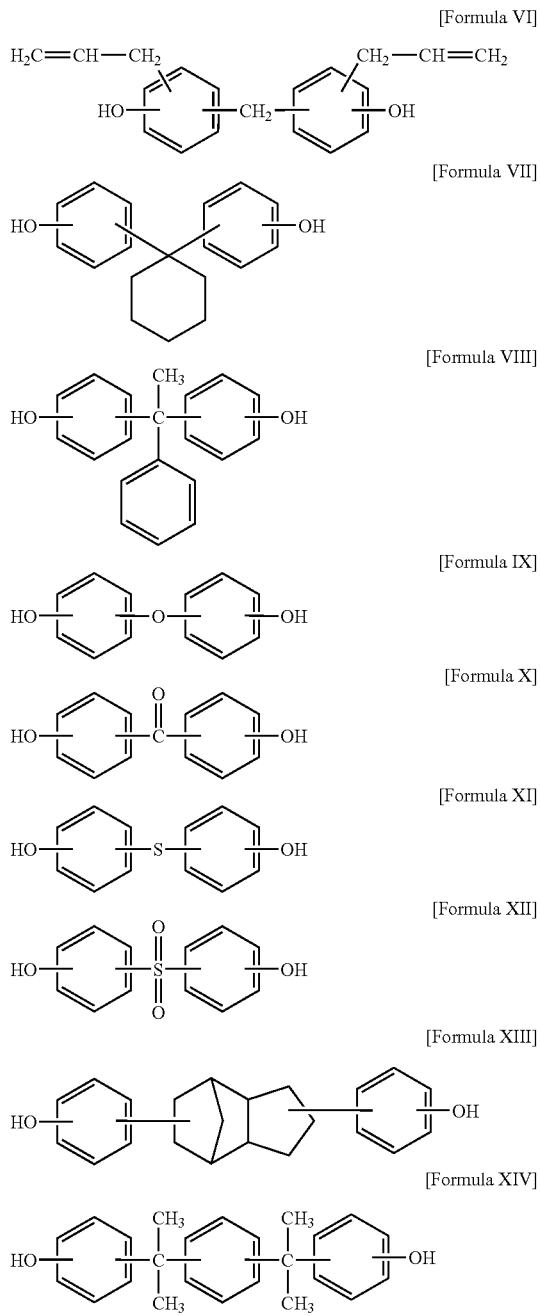

Examples of mercaptans having one active hydrogen in one molecule are methanethiol, ethanethiol, 1-propanethiol, 2-propanethiol, 1-butanethiol, 2-methyl-1-propanethiol, 2-butanethiol, 2-methyl-2-propanethiol, 1-pentanethiol, 1-hexanethiol, 1-heptanethiol, 1-octanethiol, cyclopentanethiol, cyclohexanethiol, benzylmercaptan, benzenethiol, toluenethiol, chlorobenzenethiol, bromobenzenethiol, nitrobenzenethiol, methoxybenzenethiol, and the like. Examples of mercaptans having two active hydrogen in one molecule are 1,2-ethanedithiol, 1,3-propanedithiol, 1,4-butanedithiol, 1,5-pentanedithiol, 2,2'-oxydiethanethiol, 1,6-hexanedithiol, 1,2-cyclohexanedithiol, 1,3-cyclohexanedithiol, 1,4-cyclohexanedithiol, 1,2-benzenedithiol, 1,3-benzenedithiol, 1,4-benzenedithiol, and the like.

Examples of carboxylic acids having one active hydrogen in one molecule are formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, phenoxyacetic acid, benzoic acid, toluic acid, chlorobenzoic acid, bromobenzoic acid, nitrobenzoic acid, methoxybenzoic acid, and the like. Examples of carboxylic acids having two active hydrogen in one molecule are malonic acid, methylmalonic acid, phenylmalonic acid, succinic acid, fumaric acid, maleic acid, glutaric acid, diglycolic acid, thioglycolic acid, adipic acid, pimelic acid, cyclohexane-1,2-dicarboxylic acid, cyclohexane-1,3-dicarboxylic acid, cyclohexane-1,4-dicarboxylic acid, phthalic acid, isophthalic acid, terephthalic acid, and the like.

Examples of 1,3-dicarbonyl compounds are 2,4-pentanedione, 3-methyl-2,4-pentanedione, 3-ethyl-2,4-pentanedione, 3,5-heptanedione, 4,6-nonanedione, 2,6-dimethyl-3,5-heptanedione, 2,2,6,6-tetramethyl-3,5-heptanedione, 1-phenyl-1,3-butanedione, 1,3-diphenyl-1,3-propanedione, 1,3-cyclopentanedione, 2-methyl-1,3-cyclopentanedione, 2-ethyl-1,3-cyclopentanedione, 1,3-cyclohexanedione, 2-methyl-1,3-cyclohexanedione, 2-ethyl-cyclohexanedione, 1,3-indandione, ethyl acetoacetate, diethyl malonate, and the like.

In the epoxy resin compositions of the present invention, the component (a) should be liquid at least at the injection temperature, and the components (b) and (c) should be uniformly dissolved in component (a). It is not preferable that some part of these components is solid, or makes separated phase even if all of these are liquid, because partial heterogeneity of compositions may occur during impregnation. However, even if it is impossible for these components to make homogeneous solution at room temperature, they can be used if they can satisfy the above conditions through heating.

In addition to the above components, the epoxy resin compositions of the present invention may comprise a surfactant, an internal release agent, a pigment, a flame retardant, antioxidant, UV absorbent, and the like.

It is most preferable that these additives are homogeneously dissolved in the epoxy resin composition. Although these additives are not homogeneously dissolved in the epoxy resin composition, there are no problems if they maintain a stable colloid in the form of a droplet or a particle. In this case, the diameter of the droplet or the particle is preferably less than 1 μm and more preferably less than 0.3 μm. If diameter of the droplet or the particle is larger than these ranges, it may be difficult for the droplet or particle to pass gaps in the reinforcing fibers, so that heterogeneity of compositions may occur.

The initial viscosity of the epoxy resin compositions of the present invention at 25° C. is preferably 1 to 30,000 mPa s, more preferably 1 to 20,000 mPa s and further preferably 1 to 10,000 mPa s. If the viscosity is higher than these ranges, the initial viscosity of the epoxy resin compositions at the injection temperature of 60 to 180° C. may become high, so that it takes long time to impregnate the reinforcing fibers with the resin composition.

The epoxy resin composition of which initial increase of the viscosity is low, and which have lengthened injection time and shortened curing time are preferable for the present invention.

When curing reaction is fast, it is difficult to monitor the change of the viscosity by conventional methods. Monitoring the change of ionic viscosity by means of dielectric measurement is, however, possible even though the curing reaction is fast. The ionic viscosity may be used for monitoring a progress of curing reaction as well as initial viscosity change because it can be measured after gelation, increases along with a progress of curing and is saturated along with completion of curing. A normalized logarithmic value of which the minimum has been set to 0% and maximum (saturation) has been set for 100% is called the cure index. This index is used to describe a curing profile of a thermosetting resin. By using the time required for the cure index to reach 10% as a standard for initial increase of viscosity, and time required for the cure index to reach 90% as a standard for curing time, suitable conditions wherein initial increase of viscosity is low and curing time is short, may be conveniently described. It is preferable that the epoxy resin composition of the present invention satisfies the following conditions (1) to (3) at a specific temperature T between 60 to 180° C. It is more preferable that the epoxy resin composition of the present invention satisfies the following conditions (1) to (3') at a specific temperature between 60 to 180° C.

$$1 \leq t_{10} \leq 10 \quad (1)$$

$$3 \leq t_{90} \leq 30 \quad (2)$$

$$1 < t_{90}/t_{10} \leq 3 \quad (3)$$

$$1 < t_{90}/t_{10} \leq 2.5 \quad (3')$$

wherein, $t_{10}$: time required for the cure index to reach 10% from the beginning of the measurement, which is measured by dielectric measurement at the temperature T (min.)

$t_{90}$: time required for the cure index to reach 90% from the beginning of the measurement at the temperature T, which is measured by dielectric measurement (min.)

As curing proceeds, the glass transition temperature of the resin composition rises. In general, demolding is carried out after the glass transition temperature of the resin composition exceeds the curing temperature. Thus, the time required for the glass transition temperature of the cured resin product to reach curing temperature may be used as a standard for curing time. It is preferable that the epoxy resin composition of the present invention satisfies the following conditions (4) to (6). It is more preferable that the epoxy resin composition of the present invention satisfies the following conditions (4) to (6').

$$1 \leq t_{10} \leq 10 \quad (4)$$

$$3 \leq t_v \leq 30 \quad (5)$$

$$1 < t_v/t_{10} \leq 3.0 \quad (6)$$

$$1 < t_v/t_{10} \leq 2.5 \quad (6')$$

wherein, $t_{10}$: time required for the curing index to reach 10% from the beginning of the measurement, which is measured by dielectric measurement at the temperature T(min.)

$t_v$: time required for the glass transition temperature of the cured resin product to reach the temperature T from the beginning of the measurement, that is vitrification time, which is measured at the temperature T (min.)

The epoxy resin composition of the present invention have the characteristic of which the initial increase of viscosity is low, that is, injectable time is long, and curing time is short. Therefore, it is suitable for the RTM method where the mold temperature is maintained constant from injection to demolding.

The epoxy resin composition of the present invention is also suitable for the RTM method where the mold temperature is raised after termination of the injection to cure the resin composition. And the epoxy resin composition of the present invention has the advantage of shorten the molding time, too.

The epoxy resin composition of the present invention is applicable to all methods where a liquid thermosetting resins is used, such as hand lay-up method, pultrusion method, filament winding method, and the like, as well as RTM method. And the epoxy resin composition of the present invention has the advantage to shorten the molding time in all these methods.

A process for producing fiber-reinforced composite materials is described below.

In accordance with the present invention, it is possible to produce fiber-reinforced composite materials with high Vf with good productivity.

In the RTM method of the present invention, it is necessary that the mold temperature be maintained at the specific temperature $T_m$ that is between 60 to 180° C., and the following conditions (7) to (9) and preferably (7) to (9') be satisfied.

$$t_i \leq 10 \quad (7)$$

$$t_m \leq 60 \quad (8)$$

$$1 < t_m/t_i \leq 6.0 \quad (9)$$

$$1 < t_m/t_i \leq 5.0 \quad (9')$$

wherein, $t_i$: time from the beginning of injection to the termination of injection (min.)

$t_m$: time from the beginning of injection to the beginning of demolding (min.)

In the RTM method of the present invention, the mold temperature is maintained at the specific temperature $T_m$ between 60 to 180° C. to omit raising and lowering of the mold temperature and, as a result, to shorten molding time. However, some variation of the mold temperature depending on time and place is somewhat allowed. Specifically, difference $\Delta T$ between $T_m$ and the temperature measured at any point of a surface of a cavity during a period from the beginning of injection to the beginning of demolding should be −20 to 20° C., preferably −10 to 10° C., and more preferably −5 to 5° C. If there are any portion where $\Delta T$ is too large, viscosity of the resin composition increases to give rise to gelation and to prevent impregnation. If there are any portion where $\Delta T$ is too small, partial failure of curing occurs, which is not preferable.

Time $t_i$ used herein means time from the beginning of injection to the termination of injection. Here, the beginning of injection means a point when the resin composition starts to pour into the mold, and the termination of injection means a point when the resin composition is stopped to supply into the mold. When the mold has plural inlets of which time of injection at each inlets are different from one another, or termination time of injection at each inlets are different from one another, $t_i$ is set for time from the last beginning of injection to the last termination of injection.

Time $t_m$ used herein means time from the beginning of injection to the beginning of demolding. When the mold has plural inlets of which beginning time of injection at each inlets are different from one another, $t_m$ is set for time from the last beginning of injection to the beginning of the demolding.

Epoxy resin compositions, unsaturated polyester resin compositions, vinyl ester resin compositions, phenolic resin compositions, maleimide resin compositions, and cyanate ester resin compositions are preferably used in the RIM method of the present invention.

In the RTM method of the present invention, it is difficult to measure the viscosity at the temperature $T_m$ directly because the viscosity of the resin composition varies rapidly. However, it is possible to estimate the initial viscosity at the temperature $T_m$ by measuring the viscosity at low temperature, which is easy to measure, and calculating by the formula WLF represented as formula A.

$$\ln(\eta/\eta_0) = -[A(T-T_0)]/[B+(T-T_0)] \quad \text{[Formula A]}$$

wherein, ln represents natural logarithm, T represents absolute temperature (K), $T_0$ represents reference temperature (K), $\eta$ represents viscosity of a resin composition at T (mPa s), $\eta_0$ represents viscosity of a resin composition at $T_0$ (mPa s), and A and B represent constants that are inherent to a liquid.

Specifically, four to six temperatures at which viscosity is easy to measure are selected, and one of them is set for $T_0$. Then, viscosity at each temperature is measured. Constants A and B are calculated by linear regression analysis using formula A. Finally, initial viscosity at $T_m$ is determined by using these parameters.

In the RTM method of the present invention, if initial viscosity of the resin composition at $T_m$ is low, impregnation of reinforcing fibers with the resin compositions is good. Therefore, initial viscosity at $T_m$ measured by the WLF formula is preferably 0.1 to 300 mPa s, more preferably 0.1 to 200 mPa s, and further preferably 0.1 to 100 mPa s.

In the RTM method of the present invention, glass transition temperature of fiber-reinforced composite materials after $t_m$ from the beginning of injection is preferably greater than $T_m-15°$ C. and more preferably greater than $T_m$. If the glass transition temperature is less than these ranges, matrix resin is likely to flow or creep at $T_m$, and fiber-reinforced composite materials may be deformed by force exerted when demolding is carried out.

In the RTM method of the present invention, Vf of fiber-reinforced composite materials is preferably 40 to 85% and more preferably 45 to 85% to obtain fiber-reinforced composite materials that are light-weight and excellent in their mechanical properties, such as strength and elastic modulus. If Vf is less than these ranges, mechanical properties of the fiber-reinforced composite materials, such as strength and elastic modulus, may be insufficient. If Vf is greater than these ranges, it may be necessary to inject the resin compositions into a mold in which reinforcing fibers are placed in a very high density. Thus, it may be difficult to inject the resin composition into the mold.

In the RTM method of the present invention, a plastic film, a metal or plastic plate, connection parts such as a bolt, a nut, a U link, a hinge and the like, and core materials such as a foam core, a honeycomb-core, and the like, in addition to the reinforcing fibers, may be placed in the mold.

In the RTM method of the present invention, reinforcing fiber substrates such as strands, fabrics, mats, knits, and braids are placed in the mold prior to injection of the resin compositions. Reinforcing fiber substrates may be cut and laminated to the desired shape and placed in the mold with other materials such as core materials, if necessary. Also, preforms of the reinforcing fiber substrates formed to the desired shape by methods, such as stitching or press with heat after applying a small amount of tackifier may be placed in the mold. A combination of reinforcing fiber substrates and other materials such as core materials may be used for the preforms.

In the RTM method of the present invention, a closed mold having a cavity enclosed by only stiff materials or an open mold having a cavity enclosed by stiff materials and bagging film may be used.

In the RTM method of the present invention, metals, such as carbon steel, steel alloy, cast iron, aluminum, aluminum alloy, nickel alloy, FRP (Fiber Reinforced Plastic) or wood may be used for the materials of the mold. Among them, metals are preferable because their thermal conductivity is good.

Examples of bagging film to be used for the open mold are polyamide, polyimide, polyester, silicone, and the like.

In the RTM method of the present invention, the closed mold is preferably used because the closed mold makes it possible to inject a resin composition by pressing and facilitates removal of heat produced by curing of the resin compositions.

The mold may be provided with the function to heat by circulation of a heat medium or a conventional heater.

In the RTM method of the present invention, the mold has inlets to inject a resin composition and outlets to flow out a resin composition. There are no limitation to the number or places of the inlets and outlets.

It is preferable to introduce a resin composition into a cavity through a fan gate or a film gate, specially when planar fiber-reinforced composite materials are molded.

In the RTM method of the present invention, it is preferable to apply release agents to the surface of the mold to demold the resulting fiber-reinforced composite materials easily. Examples of release agents include the silicone type, fluorine type, plant oil type, wax type, PVA type, and the like.

In the RTM method of the present invention, a gel coat or a gel coat sheet such as disclosed in Japanese patent laid-open publication No. 1993-318468 and Japanese patent laid-open publication No. 2001-288230 may be used to provide the properties to surface such as color, gloss, hardness, water resistance, weatherability, and the like.

In the RTM method of the present invention, the shorter is the injection time, the shorter is the molding time. In cases when planar fiber-reinforced composite materials are molded, it is preferable to rapidly distribute the resin composition in a planar form in the mold, and then, impregnate it mainly in the direction of thickness of the reinforcing fiber substrates to decrease the injection time. For this, a resin distribution medium, a mold having a resin distribution grooves at the surface of a cavity, and a core having a resin distribution grooves are preferably used.

As disclosed in U.S. Pat. No. 4,902,215, a resin distribution medium means a planar structure through which resin compositions are easily flowed. Metallic nets are preferably used because their heat resistance is high, and they do not dissolve in matrix resins. Plastic nets which hardly dissolve or swell even if they contact with matrix resins, such as polyethylene, polypropylene, nylon, polyester, and the like are also preferably used.

When a mold has a resin distribution grooves at the surface of a cavity, it is preferable that the cross section of the grooves is in a shape that does not inhibit demolding such as a rectangle, trapezoid, triangle or semicircle. Arrangement of the grooves depends on the shape of the cavity. In general, although there are no limitations to the arrangement of the grooves, parallel lines or a lattice is preferably used. For a mold having a planar cavity, the grooves must be placed at least at one surface of the cavity to introduce a resin composition from an inlet to the grooves. Opposing surface may or may not have grooves.

When a foam core or balsa core is used, the resin distribution grooves may be placed at the core. It is preferable that the grooves are placed on the entire surface where the core contacts with the reinforcing fiber substrates. Arrangement of the grooves depends on the shape of the cavity and the core. Although there are no limitations to the arrangement of the grooves, parallel lines or a lattice is preferably used. When a core having the grooves is used, it is necessary to design a mold in which an injected resin composition is introduced to grooves at the beginning. As disclosed in U.S. Pat. No. 5,958,325, a core having resin main feeder grooves and microgrooves may be used.

In the RTM method of the present invention, a pre-mixed single resin composition in a single tank may be transferred and injected into a mold. Alternatively, a plurality of liquids in separate tanks may be transferred to a mixer where the transferred liquids are mixed together to form resin composition, which is then injected into a mold.

In the RTM method of the present invention, the injection pressure (pressure when resin compositions are injected into a mold) is preferably 0.1 to 1.0 MPa and more preferably 0.1 to 0.6 MPa. If injection pressure is too low, injection time may become too long. If injection pressure is too high, it may not be economical because expensive plumbing, molds, and presses are required. Various pumps or pressing of a tank is used to transfer liquids.

In the RTM method of the present invention, it is preferable to use suction from outlets by a vacuum pump and the like when the resin composition is injected into a mold. Suction is effective to shorten the injection time and to prevent occurrence of dry areas or voids in the fiber-reinforced composite materials.

In the RTM method of the present invention, post-cure may be performed in a heater such as an oven after demolding to increase heat resistance of the fiber-reinforced composite materials. It is preferable that the post-cure is performed at 100 to 200° C. for 10 to 480 minutes.

The fiber-reinforced composite materials of the present invention are described below.

For the fiber-reinforced composite materials of the present invention, glass fibers, aramid fibers, carbon fibers and boron fibers are preferably used as reinforcing fibers. Among them, carbon fibers are preferably used because fiber-reinforced composite materials of lightweight and good mechanical properties, such as strength and elastic modulus, can be obtained.

The reinforcing fibers may be one of chopped fibers, continuous fibers or a combination thereof. Continuous fibers are preferable because their handling is easy and it is possible to obtain high Vf fiber-reinforced composite materials by using them.

In the fiber-reinforced composite materials of the present invention, the reinforcing fibers may be used in the form of strands. However, reinforcing fiber substrates that are processed into reinforcing fibers in the form of mats, woven fabrics, knits, braids or unidirectional sheet are preferably used.

Among them, woven fabrics are preferably used because their handling is easy, and fiber-reinforced composite materials having high Vf can be easily obtained.

A ratio of real volume of the reinforcing fibers to apparent volume of the fabrics is set for packing fraction of the fabrics. The packing fraction is determined by the formula $W/(1000 \, t \, \rho_f)$, wherein W represents areal weight (g/m$^2$), t represents thickness (mm), and $\rho_f$ represents density of the reinforcing fibers (g/cm$^3$). The areal weight and thickness of the fabrics can be determined according to JIS R 7602. It is easy to produce fiber-reinforced composite materials with high Vf from fabrics with high packing fraction. Thus, the packing fraction of the fabrics is preferable 0.10 to 0.85, more preferably 0.40 to 0.85, and further preferably 0.50 to 0.85.

Vf of the fiber-reinforced composite materials is preferably 40 to 85%, and more preferably 45 to 85% to obtain fiber-reinforced composite materials which have high specific strength and specific elastic modulus.

The specific strength of the fiber-reinforced composite materials of the present invention is preferably greater than 250 MPa cm$^3$/g, more preferably greater than 300 MPa cm$^3$/g, and further preferably greater than 350 MPa cm$^3$/g if lightweight and high strength fiber-reinforced composite materials are required. The specific strength (MPa cm$^3$/g) can be calculated from the following formula B using tensile strength $\sigma$ (MPa) determined according to ASTM D 3039 and density of the fiber-reinforced composite materials $\rho_c$ (g/cm$^3$) determined according to ASTM D 792.

$$\text{specific strength} = \sigma/\rho_c \qquad \text{[Formula B]}$$

In general, fiber-reinforced composite materials are anisotropic. Therefore, tests are made in a direction where maximum strength is obtained.

The specific elastic modulus of the fiber-reinforced composite materials of the present invention is preferably greater than 28 GPa cm$^3$/g, more preferably greater than 32 GPa cm$^3$/g, and further preferably greater than 34 GPa cm$^3$/g if lightweight and high elastic modulus fiber-reinforced composite materials are required. The specific elastic modulus (GPa cm$^3$/g) can be calculated from the following formula C using tensile modulus E (GPa) determined according to ASTM D 3039 and density of the fiber-reinforced composite materials $\rho_c$ (g/cm$^3$) determined according to ASTM D 792.

$$\text{specific elastic modulus} = E/\rho_c \qquad \text{[Formula C]}$$

In general, fiber-reinforced composite materials are anisotropic. Therefore, tests are made in a direction where maximum elastic modulus is obtained.

The preferred form of the fiber-reinforced composite materials is a monolithic plate. Another preferred form of the fiber-reinforced composite materials is a sandwich structure in which the fiber-reinforced composite materials are positioned on both surfaces of the core.

Still another preferred form of the fiber-reinforced composite materials is a canape structure in which single planar fiber-reinforced composite materials are positioned on one surface of the core.

Examples of a core of sandwich structure and canape structure are a honeycomb-core made of aluminum or aramid, a foam core made of polyurethane, polystyrene, polyamide, polyimide, polyvinyl chloride, phenolic resin, acrylic resin, epoxy resin, and the like, wood including balsa, and the like. Among these, the foam core is preferably used because it can produce lightweight fiber-reinforced composite materials.

The density of the core is preferably 0.02 to 0.10 g/cm³ and more preferably 0.02 to 0.08 g/cm³ to obtain lightweight fiber-reinforced composite materials. The density of the core can be determined according to ISO 845.

If the glass transition temperature of the core is low, it is likely that the core deforms during molding. Therefore, the glass transition temperature of the core is preferably more than 80° C., more preferably more than 100° C. and further preferably more than 120° C.

In the sandwich structure fiber-reinforced composite materials, the higher is the shear modulus of elasticity of the core, the higher is the flexural stiffness. Therefore, the shear modulus of elasticity is preferably more than 2.0 MPa, more preferably more than 4.0 MPa, and further preferably more than 6.0 Mpa. The shear modulus of elasticity of the core is determined according to ASTM C 273.

If the independent bubble content of the core is great, it is difficult for the resin composition to penetrate into the core. Therefore, the independent bubble content of the core is preferably more than 0.70, more preferably more than 0.80, and further preferably more than 0.90. The independent bubble content of the core is determined according to ASTM D 1940.

When the fiber-reinforced composite materials of the present invention are used for the stylish surface such as the outer skin of automobiles, the surface roughness $R_a$ of at least one side of the fiber-reinforced composite materials is preferably less than 1.0 μm, more preferably less than 0.6 μm, and further preferably less than 0.4 μm. The surface roughness $R_a$ is determined according to ISO 468.

The fiber-reinforced composite materials of the present invention are particularly suitable for structural parts, outer skins and aerodynamic parts of transports such as spacecrafts including rockets, artificial satellites, and the like, aircrafts, trains, marines, automobiles, motorcycles, bicycles, and the like, because they are lightweight and have good mechanical properties such as strength and elastic modulus.

Because the productivity of the fiber-reinforced composite materials of the present invention is high, they are preferably used for structural parts, outer skins and aerodynamic parts of motorcycles and automobiles of mass production. Specific examples are structural parts such as platforms, outer skins of automobiles such as front apron, hood, roof, hard top (a removable roof of a convertible car), a piller, trunk lid, door, fender and side mirror cover, and the like, and aerodynamic parts such as front air dam, rear spoiler, side air dam, engine under cover, and the like.

The fiber-reinforced composite materials of the present invention can be used for other applications besides the above applications. Specific examples are interior trim materials of automobiles such as an instrument panel.

EXAMPLES

The following examples will explain the present invention more specifically. Each property was determined by the following methods. Also, the following resin components were used in the examples.

Component a
"Epo Tohto" YD128: registered trademark, produced by Tohto Kasei Co., Ltd., epoxy resin (diglycidylether of bisphenol A)

Component b
2-methylimidazole: produced by Shikoku Kasei Kogyo Co., Ltd., imidazole derivative Component c
glycerin: produced by Tokyo Kasei Kogyo Co., Ltd., alcohol
1,2-ethanediol: produced by Tokyo Kasei Kogyo Co., Ltd., alcohol
benzyl alcohol: produced by Wako Junyaku Kogyo, Ltd., alcohol
isopropyl alcohol: produced by Tokyo Kasei Kogyo Co., Ltd., alcohol
propylene glycol: produced by Wako Junyaku Kogyo, Ltd., alcohol
"Rikaresin" PO-20: registered trademark, produced by Shin Nippon Rika Co., Ltd., alcohol (propylene oxide adduct of bisphenol A)
2,4-dimethylphenol: produced by Tokyo Kasei Kogyo Co., Ltd., phenol
propionic acid: produced by Tokyo Kasei Kogyo Co., Ltd., carboxylic acid Measurement of Viscosity of a Resin Composition Viscosity of the component (a) and that of the resin composition just after the composition was prepared, were measured according to ISO 2884-1 by using the cone-and-plate rotary viscometer. The viscometer was TVE-30H manufactured by Toki Sangyo Co., Ltd. The rotor used was 1° 34'×R24. An amount of each sample was 1 cm³.

Method for Estimating Viscosity at the Temperature $T_m$ by Using the Formula WLF Viscosity of the resin composition was measured at 10, 30, 50 and 70° C. according to the above method. The reference temperature $T_0$ was set for 10° C. The constants A and B were calculated by linear regression analysis by using formula A. Then, viscosity at $T_m$ was estimated from these parameters.

$$\ln(\eta/\eta_0) = -[A(T-T_0)]/[B+(T-T_0)] \quad \text{[Formula A]}$$

wherein, ln represents natural logarithm, T represents absolute temperature (K), $T_0$ represents reference temperature (K), η represents viscosity of the resin composition at T (mPa s), $\eta_0$ represents viscosity of the resin composition at $T_0$ (mPa s), and A and B represent constants that are inherent to a liquid.

Dielectric Measurement

Curing of the resin composition was monitored by dielectric measurement. The dielectric measurement device was MDE-10 curing monitor manufactured by Holometrix-Micromet. The TMS-1 inch sensor was installed in the lower plate of the programmable mini-press MP2000. The O-ring made of Viton, which had internal diameter of 31.7 mm and thickness of 3.3 mm, was placed on the lower plate of the press, and the temperature of the press was set for predetermined T. The epoxy resin composition was poured into the inside of the O-ring, and the press was closed. Change of ionic viscosity of the resin composition vs. time was monitored. The dielectric measurement was carried out at the frequencies of 1, 10, 100, 1,000 and 10,000 Hz.

The cure index was calculated by the following formula D. Then, a ratio $t_{90}/t_{10}$ (wherein, $t_{10}$: time required for the cure index to reach 10%, $t_{90}$: time required for the cure index to reach 90%) was determined.

$$\text{cure index} = [\log(\alpha) - \log(\alpha_{min})]/[\log(\alpha_{max}) - \log(\alpha_{min})] \times 100 \quad \text{[Formula D]}$$

wherein,
log: common logarithm
unit of cure index: %
α: ionic viscosity (Ωcm)
$\alpha_{min}$: minimum ionic viscosity (Ωcm)
$\alpha_{max}$: maximum ionic viscosity (Ωcm)

Measurement of Glass Transition Temperature of a Cured Resin Product

The O-ring made of Viton, which had internal diameter of 31.7 mm and thickness of 3.3 mm, was installed at the lower plate of the programmable mini-press MP2000, and the temperature of the press was set for predetermined T. And then, the resin composition was added to the interior of the O-ring, and the press was closed. The resin composition was cured for the predetermined period. The resulting cured resin product was cut to make a sample having a width of 12 mm and length of 40 mm. The sample was measured by the viscoelastometer ARES manufactured by Rheometric Scientific with a rectangular torsion mode, and with temperature raising rate of 20° C./min, and frequency of 1 Hz, to determine a peak of Loss modulus G". If the number of the peaks is two, a peak of lower temperature is selected. From the peak of Loss modulus G", the glass transition temperature was determined.

Estimation of $t_v$

Glass transition temperatures of the cured resin after 6, 8, 10, 12, 14 and 20 minutes at the predetermined temperature T were measured according to the above method. The time necessary for the glass transition temperature of the cured resin products to reach T ($t_v$) was estimated by interpolation of these data.

Preparation of a Cured Resin Plate

Stainless steel spacers with a dimension of 150 mm×150 mm×2 mm were installed at the lower plate of a press, and the temperature of the press was set for the predetermined temperature T. And then, the resin composition was added to the interior of the spacer, and the press was closed. After 20 minutes, the press was opened to obtain the cured resin plate.

Measurement of Flexural Modulus of a Cured Resin

A sample with width of 10 mm and length of 60 mm was made by cutting the above cured resin plate. Flexural modulus was measured with the 3 points flexural test according to ISO 178. The test device used was the Tensilon 4201 manufactured by Instron Company. The crosshead speed used was 2.5 mm/min, span space was 32 mm, and the temperature during measurement was 23° C.

Measurement of Tensile Elongation of a Cured Resin

Tensile elongation was measured by using the above cured resin plate according to ISO 527-2. The test device used was the Tensilon 4201 manufactured by Instron Company. The temperature during measurement was 23° C.

Measurement of Fiber Volume Fraction (Vf) of a Fiber-reinforced Composite Material The fiber volume fraction (Vf) of a fiber-reinforced composite material was measured according to ASTM D 3171.

Measurement of Density ($\rho_c$) of a Fiber-reinforced Composite Material

Density $\rho_c$ of a fiber-reinforced composite material was measured according to ASTM D 792.

Measurement of Glass Transition Temperature of a Fiber-reinforced Composite Material The inlet side of the fiber-reinforced composite material was cut to make a sample with width of 12 mm and length of 55 mm. The sample was measured by the viscoelastometer ARES manufactured by Rheometric Scientific with a rectangular torsion mode and with a temperature raising rate of 20° C./min and frequency of 1 Hz, to determine the peak of Loss modulus G". If there are two peaks detected, the peak of lower temperature is selected. From the peak of Loss modulus G", glass transition temperature was determined.

Measurement of Specific Strength and Specific Elastic Modulus of a Fiber-reinforced Composite Material by Tensile Test The fiber-reinforced composite material was cut to make a sample with width of 12.7 mm and length of 229 mm, which had length direction identical to the 0° direction. The 0° tensile strength σ (MPa) and 0° tensile modulus E (GPa) were measured with the sample according to ASTM D 3039. The test device used was the Tensilon 4208 manufactured by Instron Company. The crosshead speed was 1.27 mm/min, and the temperature during measurement was 23° C. Specific strength (MPa cm³/g) and specific elastic modulus (GPa cm³/g) were determined by the following formulas B and C and $\rho_c$ measured in the above.

specific strength=$\sigma/\rho_c$ [Formula B]

specific elastic modulus=$E/\rho_c$ [Formula C]

Measurement of Density of a Core

Density of cores was measured according to ISO 845.

Measurement of Glass Transition Temperature of a Core

Glass transition temperature of core was measured using a sample with width of 12 mm and length of 55 mm according to SACMA SRM18R-94. The test device used was the viscoelastmeter ARES manufactured by Rheometric Scientific. The measurement was made with a rectangular torsion mode, and with temperature raising rate of 5° C./min, and frequency of 1 Hz, to determine storage modulus G'. From the onset of the storage modulus G', glass transition temperature was determined.

Measurement of Shear Modulus of Elasticity of a Core

Shear modulus of elasticity of a core was measured using a sample with width of 50 mm, length of 150 mm and thickness of 10 mm according to ASTM C 273.

Measurement of Surface Roughness $R_a$ of a Fiber-reinforced Composite Material

Surface roughness $R_a$ of a fiber-reinforced composite material was measured according to ISO 845. The test device used was Surftest 301 manufactured by Mitutoyo.

Examples 1, 2, 3 and 5

The component (b) represented in Table 1, below, was added to the component (c). This mixture was heated to 90° C. to make a solution. The resulting solution was maintained at 70° C. The component (a) that had been heated to 70° C. was added to the solution. The solution was stirred for 1 minute to give an epoxy resin composition. The epoxy resin composition of example 1 was turbid to white at 70° C. but became a uniform solution at 100° C. The epoxy resin compositions of examples 2, 3 and 5 were uniform solutions at 70° C.

The $t_{90}/t_{10}$ of the epoxy resin compositions of examples 1, 2, 3 and 5 were 1.7, 1.8, 1.9 and 2.3, respectively, which were all satisfactory values (FIG. 1 shows change of cure index of the resin compositions of examples 1 and 2 vs. time by dielectric measurement).

The $t_v/t_{10}$ of the epoxy resin compositions of examples 1, 2, 3 and 5 were 1.9, 2.3, 2.5 and 1.9, respectively, which were all satisfactory values.

The flexural modulus the cured resin products of examples 1, 2, 3 and 5 were 3.5 GPa, 3.2 GPa, 3.1 GPa, and 3.4 GPa, respectively. The tensile elongation of the cured resin products of examples 1, 2, 3 and 5 were 4.1%, 4.7%, 4.8% and 4.5% respectively. These values were sufficiently high.

Example 4

The component (b) represented in Table 1 was added to the component (c). This mixture was heated to 90° C. to make a solution. The resulting solution was maintained at 70° C. The component (a) which had been heated to 70° C. was added to the solution. The solution was stirred for 1 minute to give an epoxy resin composition. The epoxy resin composition was a uniform solution at 70° C.

The $t_{90}/t_{10}$ was 2.2, which was a satisfactory value.

The $t_v/t_{10}$ was 2.9, which was a relatively satisfactory value.

The flexural modulus of the cured resin product was 3.0 GPa, which was a relatively high value. The tensile elongation of the cured resin product was 4.4%, which was a sufficiently high value.

Examples 6 and 7

The component (b) represented in Table 1 was added to the component (c). This mixture was heated to 90° C. to make a solution. The resulting solution was maintained at 70° C. The component (a) which had been heated to 70° C. was added to the solution. The solution was stirred for 1 minute to give an epoxy resin composition. The epoxy resin compositions of examples 6 and 7 were uniform solutions at 70° C.

The $t_{90}/t_{10}$ of the epoxy resin compositions of examples 6 and 7 were all 2.1, which were satisfactory values. The $t_v/t_{10}$ of the epoxy resin compositions of examples 6 and 7 were 2.4 and 2.5, respectively, which were satisfactory values.

The flexural modulus of the cured resin products of examples 6 and 7 were 3.2 GPa and 3.1 GPa, respectively. The tensile elongation of the cured resin products of examples 6 and 7 were 4.3% and 4.0%. These values were sufficiently high.

Comparative Example 1

The component (b) represented in Table 1 was grinded with an agate mortar to give fine particulates. This was added to the component (a) that had been heated to 70° C. The mixture was stirred and dispersed for 1 minute to give an epoxy resin composition. The epoxy resin composition became a uniform solution at 100° C.

The $t_{10}$ of the epoxy resin composition was equal to those of examples 1 and 2. The $t_{90}/t_{10}$, however, was 3.6, which was not a satisfactory value (FIG. 1 shows change of cure index of the resin composition vs. time by dielectric measurement).

The $t_v/t_{10}$ was 3.9, which was not a satisfactory value.

The flexural modulus of the cured resin product was 3.1 GPa, which was sufficiently high value, but the tensile elongation of the cured resin product was 1.7%, which was not a satisfactory value.

Comparative Example 2

The component (c) that had been heated to 70° C. was added to the component (a) represented in Table 1. This was stirred for 1 minute to give an epoxy resin composition. Dielectric measurement showed that there was little change in the ion viscosity. The epoxy resin composition of comparative example 2 was still liquid when observed by opening a programmable mini-press after 30 minutes.

Comparative Example 3

The component (b) represented in Table 1 was added to the component (c). This mixture was heated to 90° C. to make a solution. The resulting solution was maintained at 70° C. The component (a) that had been heated to 70° C. was added to the solution. The solution was stirred for 1 minute to give an epoxy resin composition. The epoxy resin composition was turbid to white, even at 100° C.

In the dielectric measurement, the $\alpha_{max}$ could not be measured because ion viscosity changed too slowly.

Also, $t_v$ could not be estimated because the glass transition temperature of the epoxy resin composition was only 52° C. after 20 minutes.

Example 8

A monolithic plate of fiber-reinforced composite material was prepared by using the epoxy resin composition of example 5 at the mold temperature of 90° C.

The initial viscosity of the epoxy resin composition of example 5 at 90° C., which was estimated by the formula WLF, was 36 mPa s.

Figure 2:
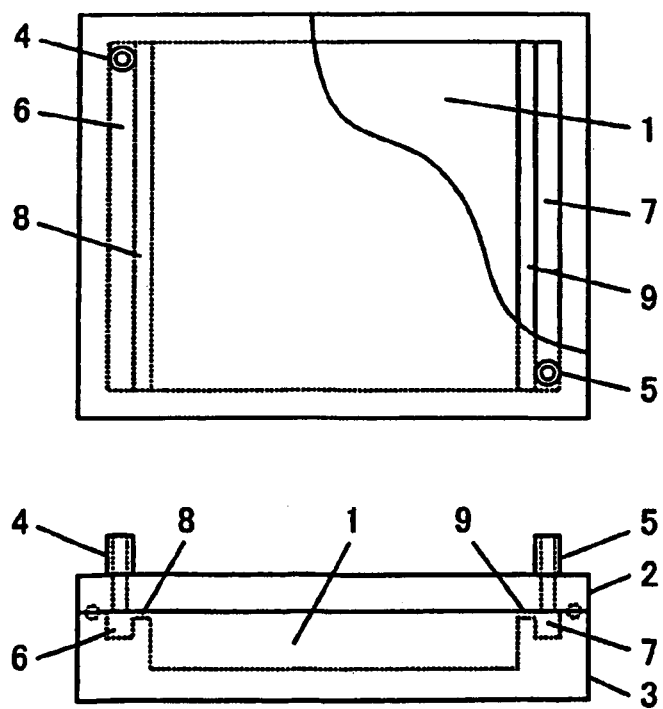
FIG. 2. is the illustration of top surface and cross section of the mold used for producing the fiber-reinforced composite materials of the present invention.

Referring to FIG. 2, the mold used comprised a rectangular parallelepiped cavity with a width of 600 mm, length 600 mm and height 1.5 mm (reference number 1), upper mold (reference number 2), and lower mold (reference number 3), wherein the upper mold had an inlet (reference number 4) and outlet (reference number 5), the lower mold had runners (reference numbers 6 and 7) and film gates (reference numbers 8 and 9) corresponding to the inlet and the outlet.

For reinforcing fiber substrates, a 600 mm×600 mm square carbon fiber fabrics C06343 (using T300B-3K, areal weight 192 g/m², Toray Co., Ltd.), which had sides parallel to weft and warp of the carbon fiber fabrics, was used. For a peel ply, a 600 mm×600 mm square polyester fabric was used. For resin distribution medium, 580 mm×580 mm square nylon net was used.

Figure 3:
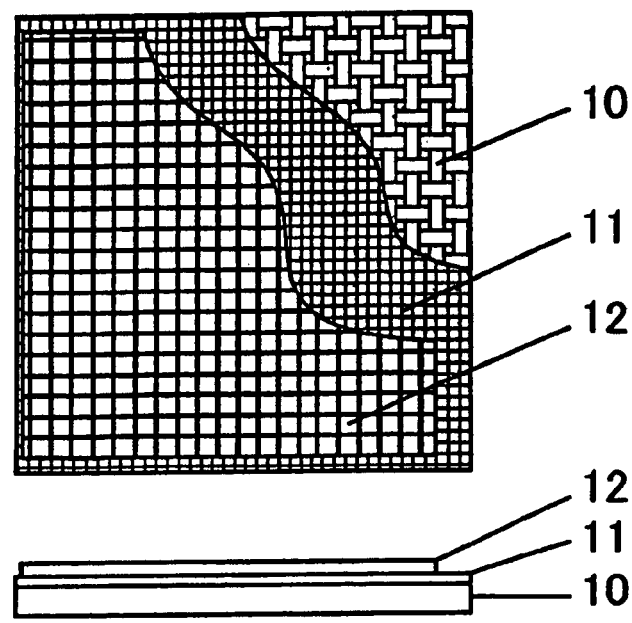
FIG. 3. is the illustration of top surface and cross section of the arrangement of reinforcing fiber substrate, peel ply and resin distribution medium used in a process for producing planar fiber-reinforced composite materials of the present invention.

Referring to FIG. 3, after six reinforcing fiber substrates (reference number 10), a peel ply (reference number 11) and a resin distribution medium (reference number 12) were placed in the cavity of the mold, and the mold was closed. The pressure of the inside of the mold that was maintained at 98° C. decreased to atmospheric pressure −0.1 MPa with a vacuum pump connected to the outlet. The epoxy resin composition of example 5 was injected into the mold with an injection pressure of 0.2 MPa. The injection was terminated after 6.5 minutes from the beginning of injection. The mold was opened after 25 minutes from the beginning of injection, and a fiber-reinforced composite material was obtained.

The Vf of the fiber-reinforced composite material was 52%.

The glass transition temperature of the fiber-reinforced composite material was 98° C.

The specific strength and specific elastic modulus of the fiber-reinforced composite material were 400 MPa cm³/g and 40 GPa cm³/g, which were sufficiently high values.

The surface roughness $R_a$ of the fiber-reinforced composite material was 0.38 μm, which was a satisfactory value.

Example 9

A monolithic plate of fiber-reinforced composite material was prepared by using the epoxy resin composition of example 5 at the mold temperature of 105° C. The initial viscosity of the epoxy resin composition of example 5 at 105° C., which was estimated by the formula WLF, was 20 mPa s.

The mold used, reinforcing fiber substrates, a peel ply and a resin distribution medium were all the same as those of example 8. Referring to FIG. 3, after six reinforcing fiber substrates (reference number 10), a peel ply (reference number 11) and a resin distribution medium (reference number 12) were placed in the cavity of the mold, and the mold was closed. The pressure of the inside of the mold that was maintained at 105° C. was decreased to atmospheric pressure −0.1 MPa with a vacuum pump connected to the outlet. The epoxy resin composition of example 5 was injected into the mold with an injection pressure of 0.2 MPa. The injection was terminated after 3.3 minutes from the beginning of injection. The mold was opened after 12.0 minutes from the beginning of injection, and a fiber-reinforced composite material was obtained.

The Vf of the fiber-reinforced composite material was 52%.

The glass transition temperature of the fiber-reinforced composite material was 116° C.

The specific strength and specific elastic modulus of the fiber-reinforced composite material were 380 MPa cm$^3$/g and 40 GPa cm$^3$/g, which were sufficiently high values.

The surface roughness $R_a$ of the fiber-reinforced composite material was 0.44 μm, which was a satisfactory value.

Example 10

A monolithic plate fiber-reinforced composite material was prepared by using the epoxy resin composition of comparative example 1 at the mold temperature of 105° C.

The mold used, reinforcing fiber substrates, a peel ply and a resin distribution medium were the same as those of example 8. Referring to FIG. 3, after six reinforcing fiber substrates (reference number 10), a peel ply (reference number 11) and a resin distribution medium (reference number 12) were placed in the cavity of the mold, and the mold was closed. The pressure of the inside of the mold that was maintained at 105° C. decreased to atmospheric pressure −0.1 MPa with a vacuum pump connected to the outlet. The epoxy resin composition of comparative example 1 was injected into the mold with an injection pressure of 0.2 MPa. The injection was terminated after 2.8 minutes from the beginning of injection. The mold was opened after 12.0 minutes from the beginning of injection, and a fiber-reinforced composite material was obtained.

The glass transition temperature of the fiber-reinforced composite material was 88° C., which was very much lower than the mold temperature.

Example 11

A fiber-reinforced composite material of sandwich structure was prepared by using the epoxy resin composition of example 5 at the mold temperature of 90° C.

Referring to FIG. 2, the mold used comprised a rectangular parallelepiped cavity with a width of 600 mm, length 600 mm and height 13.5 mm (reference number 1), upper mold (reference, number 2), and lower mold (reference number 3), wherein the upper mold had an inlet (reference number 4) and outlet (reference number 5), the lower mold had runners (reference numbers 6 and 7) and film gates (reference numbers 8 and 9) corresponding to the inlet and the outlet.

For the reinforcing fiber substrates, rectangular (width 600 mm, length 598 mm) carbon fiber fabrics C06343 (using T300B-3K, areal weight 192 g/m$^2$, Toray Co., Ltd.) of which sides are parallel to weft and warp of the carbon fiber fabrics were used.

For the core, Rohacell 511G which had a thickness of 12.7 manufactured by Rohm Company was used, which was cut to width of 600 mm and length of 598 mm, and on which resin distribution grooves with a cross section of rectangle with width of 1 mm and depth of 2 mm are engraved longitudinally parallel to one another with intervals of 25 mm on the upper and the lower surfaces. The density, the glass transition temperature, and the shear modulus of the Rohacell 511G were 0.052 g/cm$^3$, 152° C., and 19 MPa.

Figure 4:
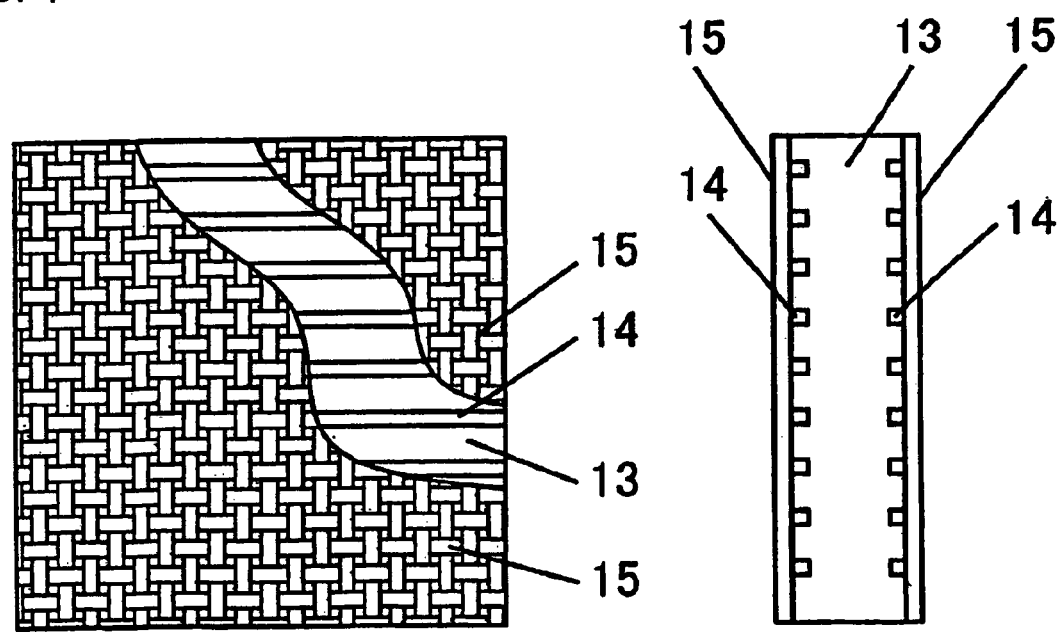
FIG. 4. is the illustration of top surface and cross section of the arrangement of reinforcing fiber substrate and core used in a process for producing sandwich structure fiber-reinforced composite materials of the present invention.

Referring to FIG. 4, after two reinforcing fiber substrates (reference number 15), a core (reference number 13) having resin distribution grooves (reference number 14) and two reinforcing fiber substrates (reference number 15) were overlapped over one another in the cavity of the mold, and the mold was closed. The reinforcing fiber substrates and the core were placed in a manner such that gaps of 1 mm width were formed beside the inlet and the outlet, and nylon nets were set to the gaps to introduce the resin composition into the resin distribution grooves at the lower surface of the core. Then, the pressure of the inside of the mold that was maintained at 90° C. was decreased to atmospheric pressure −0.1 MPa with a vacuum pump connected to the outlet. The epoxy resin composition of example 5 was injected into the mold with an injection pressure of 0.2 MPa. The injection was terminated after 4.8 minutes from the beginning of injection. The mold was opened after 20.0 minutes from the beginning of injection, and a fiber-reinforced composite material was obtained.

The surface roughness $R_a$ of the fiber-reinforced composite material was 0.39 μm, which was satisfactory value.

Example 12

A sandwich structure fiber-reinforced composite material was prepared by using the epoxy resin composition of example 5 at the mold temperature of 105° C.

The mold used, reinforcing fiber substrates and a core were the same as those of example 11.

Referring to FIG. 4, after two reinforcing fiber substrates (reference number 15), a core (reference number 13) having resin distribution grooves (reference number 14) and two reinforcing fiber substrates (reference number 15) were overlapped over one another in the cavity of the mold, and the mold was closed. The reinforcing fiber substrates and the core were placed in a manner such that gaps of 1 mm width were formed beside the inlet and the outlet of the cavity, and nylon nets were set to the gaps to introduce the resin composition into the resin distribution grooves at the lower surface of the core. The pressure of the inside of the mold that was maintained at 105° C. was decreased to atmospheric pressure −0.1 MPa with a vacuum pump connected to the outlet. The epoxy resin composition of example 5 was injected into the mold with an injection pressure of 0.2 MPa. The injection was terminated after 2.2 minutes from the beginning of injection. The mold was opened after 10.0 minutes from the beginning of injection, and a fiber-reinforced composite material was obtained.

The surface roughness $R_a$ of the fiber-reinforced composite material was 0.45 μm, which was a satisfactory value.

INDUSTRIAL APPLICABILITY

According to the present invention, a high Vf fiber-reinforced composite material will be made by the RTM method with good productivity.

The epoxy resin composition of the present invention has the characteristic of long injectable time and short curing time. Therefore, a high Vf fiber-reinforced composite material will be produced with good productivity by using the epoxy resin composition of the present invention.

Because the fiber-reinforced composite materials produced by the process of the present invention or the fiber-reinforced composite materials obtained from the epoxy resin composition of the present invention have good mechanical properties such as strength and elastic modulus, they are preferably used for structural parts, outer skins and aerodymamic parts of transports, such as spacecrafts including rockets, artificial satellites, and the like, aircrafts, trains, marines, automobiles, motorcycles, bicycles, and the like. Among them, they are particularly preferably used for structural parts, outer skins and aerodymamic parts of motorcycles and automobiles produced in mass quantities.

TABLE 2

|  |  | Examples | | |
|---|---|---|---|---|
|  |  | 8 | 9 | 10 |
| molding condition | mold temperature $T_m$ (° C.) | 90 | 105 | 105 |
|  | $t_i$ (min.) | 6.5 | 3.3 | 2.8 |
|  | $t_m$ (min.) | 25.0 | 12.0 | 12.0 |
|  | $t_m/t_i$ | 3.8 | 3.6 | 4.3 |
| viscosity of the resin composition (mPa s) | 10° C. | 154500 | 154500 | 391000 |
|  | 30° C. | 3930 | 3930 | 13350 |
|  | 50° C. | 439 | 439 | 922 |
|  | 70° C. | 102 | 102 | 112 |
|  | viscosity at $T_m$ estimated by the formula WLF | 36 | 20 | 9 |
| physical properties of the composite material | degree of impregnation | overall | overall | overall |
|  | Vf (%) | 52 | 52 | — |
|  | Density $\rho_c$ (g/cm$^3$) | 1.5 | 1.5 | — |
|  | glass transition temperature after $t_m$ (° C.) | 98 | 116 | 88 |
|  | specific strength by tensile test (MPa · cm$^3$/g) | 400 | 380 | — |

TABLE 1

|  |  |  | Examples | | | | | | | Comparative examples | | |
|---|---|---|---|---|---|---|---|---|---|---|---|---|
|  |  |  | 1 | 2 | 3 | 4 | 5 | 6 | 7 | 1 | 2 | 3 |
| composition of epoxy resin (% by weight) | component a | "Epo-Tohto" YD128 (di-functional aromatic epoxy resin) | 100 | 100 | 100 | 100 | 100 | 100 | 100 | 100 | 100 | 100 |
|  | component b | 2-methylimidazole (imidazole derivative) | 3.0 | 3.0 | 3.0 | 3.0 | 3.0 | 3.0 | 3.0 | 3.0 | — | 3.0 |
|  | component c | glycerin (alcohol) | 3.1 | — | — | — | — | — | — | — | 3.1 | 4.0 |
|  |  | 1,2-ethandiol (alcohol) | — | 2.1 | — | — | — | — | — | — | — | — |
|  |  | benzyl alcohol (alcohol) | — | — | 3.6 | — | — | — | — | — | — | — |
|  |  | isopropyl alcohol (alcohol) | — | — | — | 2.1 | — | — | — | — | — | — |
|  |  | propylene glycol (alcohol) | — | — | — | — | 2.0 | — | — | — | — | — |
|  |  | "Rikaresin" PO-20 (alcohol) | — | — | — | — | 6.0 | — | — | — | — | — |
|  |  | 2,4-dimethylphenol (phenol) | — | — | — | — | — | 4.1 | — | — | — | — |
|  |  | propionic acid (carboxylic acid) | — | — | — | — | — | — | 2.5 | — | — | — |
| viscosity of the component (a) at 25° C. (Pa s) | | | 12.0 | 12.0 | 12.0 | 12.0 | 12.0 | 12.0 | 12.0 | 12.0 | 12.0 | 12.0 |
| initial viscosity of the epoxy resin composition at 25° C. (Pa s) | | | 12.3 | 11.9 | 6.3 | 6.9 | 8.7 | 8.7 | 10.6 | 13.4 | 12.8 | 27.8 |
| curing properties of the epoxy resin composition | temperature T (° C.) | | 100 | 100 | 100 | 100 | 100 | 100 | 100 | 100 | 100 | 100 |
|  | $t_{10}$ (min.) | | 3.5 | 3.3 | 3.2 | 3.8 | 3.8 | 3.1 | 4.2 | 3.2 | — | — |
|  | $t_{90}$ (min.) | | 6.0 | 6.1 | 6.2 | 8.2 | 8.9 | 6.4 | 8.8 | 11.5 | — | — |
|  | $t_{90}/t_{10}$ | | 1.7 | 1.8 | 1.9 | 2.2 | 2.3 | 2.1 | 2.1 | 3.6 | — | — |
|  | glass transition temperature after 6 minutes at T (° C.) | | 94 | 85 | 86 | — | 95 | 89 | — | — | — | — |
|  | glass transition temperature after 8 minutes at T (° C.) | | 115 | 105 | 103 | 88 | 111 | 106 | 84 | 68 | — | — |
|  | glass transition temperature after 10 minutes at T (° C.) | | 117 | 110 | 109 | 96 | 118 | 113 | 99 | 85 | — | — |
|  | glass transition temperature after 12 minutes at T (° C.) | | 120 | 113 | 112 | 104 | 120 | 115 | 103 | 98 | — | — |
|  | glass transition temperature after 14 minutes at T (° C.) | | 121 | 115 | 114 | 108 | 122 | 118 | 107 | 106 | — | — |
|  | glass transition temperature after 20 minutes at T (° C.) | | 124 | 116 | 116 | 112 | 125 | 121 | 113 | 115 | — | 52 |
|  | $t_v$ (min.) | | 6.6 | 7.5 | 8.0 | 11.0 | 7.3 | 7.3 | 10.5 | 12.5 | — | — |
|  | $t_v/t_{10}$ | | 1.9 | 2.3 | 2.5 | 2.9 | 1.9 | 2.4 | 2.5 | 3.9 | — | — |
| physical properties of the cured resin product | flexural modulus of elasticity (GPa) | | 3.5 | 3.2 | 3.1 | 3.0 | 3.4 | 3.2 | 3.1 | 3.1 | — | — |
|  | tensile elongation (%) | | 4.1 | 4.7 | 4.8 | 4.4 | 4.5 | 4.3 | 4.0 | 1.7 | — | — |

TABLE 2-continued

| | Examples | | |
|---|---|---|---|
| | 8 | 9 | 10 |
| specific elastic modulus by tensile test (GPa · cm³/g) | 40 | 40 | — |
| surface roughness $R_a$ (μm) | 0.38 | 0.44 | — |

TABLE 3

| | | Examples | |
|---|---|---|---|
| | | 11 | 12 |
| molding condition | mold temperature $T_m$ (° C.) | 90 | 105 |
| | $t_i$ (min.) | 4.8 | 2.2 |
| | $t_m$ (min.) | 20.0 | 10.0 |
| | $t_m/t_i$ | 4.2 | 4.5 |
| viscosity of the resin composition (mPa s) | 10° C. | 154500 | 154500 |
| | 30° C. | 3930 | 3930 |
| | 50° C. | 439 | 439 |
| | 70° C. | 102 | 102 |
| | viscosity at $T_m$ estimated by the formula WLF | 36 | 20 |
| physical properties of core member | Density (g/cm³) | 0.052 | 0.052 |
| | glass transition temperature (° C.) | 152 | 152 |
| | shear modulus of elasticity (MPa) | 19 | 19 |
| surface degree of the composite material | surface roughness $R_a$ (μm) | 0.39 | 0.45 |

What is claimed is:

1. An epoxy resin composition, comprising:
component (a) epoxy resin,
component (b) anionic polymerization initiator and
component (c) proton donor,
wherein the amount of component (c) based on 100 parts by weight of component (a) is 1 to 30 parts by weight; component (a) is a liquid; and components (b) and (c) are homogeneously dissolved in component (a); component (c) is at least one member selected from the group consisting of a polyhydric alcohol with two hydroxy functional groups and a mercaptan with two mercapto functional groups; and component (c) has an aromatic ring.

2. The epoxy resin composition according to claim 1, wherein said component (b) is a tertiary amine.

3. The epoxy resin composition according to claim 2, wherein said component (b) is an imidazole derivative.

4. The epoxy resin composition according to claim 3, wherein said component (b) is represented by the following general formula I:

[Formula I]

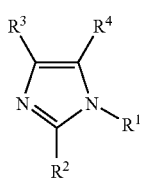

wherein, $R^1$ represents a member selected from the group consisting of hydrogen atom, a methyl group, an ethyl group, a benzyl group and a cyanoethyl group; $R^2$, $R^3$ and $R^4$ independently one on other represent a member selected from the group consisting of hydrogen atom, a methyl group and an ethyl group.

5. The epoxy resin composition according to claim 1, wherein said component (c) is a polyhydric alcohol.

6. The epoxy resin composition according to claim 5, wherein said component (c) is a polyhydric alcohol which has a boiling point of greater than 1000° C. at atmospheric pressure.

7. The epoxy resin composition according to claim 1, wherein the initial viscosity of the composition at 250° C. is between 1 to 30,000 mPa s.

8. The epoxy resin composition according to claim 1, wherein the epoxy resin composition satisfies the following conditions (1) to (3) at a specific temperature T that $t_{90}$ is between 60 to 1800° C.:

$$1 \leq t_{10} \leq 10 \quad (1)$$

$$3 \leq t_{90} \leq 30 \quad (2)$$

$$1 \leq t_{90}/t_{10} \leq 3 \quad (3)$$

wherein, $t_{10}$ is time (in minutes) required for the cure index to reach 10% from the beginning of the measurement, which is determined by dielectric measurement at the temperature T and $t_{90}$ is time (in minutes) required for the cure index to reach 90% from the beginning of the measurement, which is determined by dielectric measurement at the temperature T.

9. The epoxy resin composition according to claim 1, wherein the epoxy resin composition satisfies the following conditions (4) to (6) at a specific temperature T that is between 60 to 180° C.:

$$1 \leq t_{10} \leq 10 \quad (4)$$

$$3 \leq t_v \leq 30 \quad (5)$$

$$1 t_v/t_{10} 3 \quad (6)$$

wherein, $t_{10}$ is time required for the cure index to reach 10% from the beginning of the measurement, which is determined by dielectric measurement at the temperature T(min.) and $t_v$ is time (in minutes) required for the glass transition temperature of the cured resin product to reach T from the beginning of the measurement at the temperature T.

10. A cured product of the epoxy resin composition of claim 1.

* * * * *